United States Patent [19]

Croisier et al.

[11] 4,024,342

[45] May 17, 1977

[54] SYSTEM FOR DETECTING DIGITAL DATA TRANSMITTED BY MODULATING A CARRIER

[75] Inventors: Alain Croisier, Cagnes, Mer; André Eugene Desblache, Nice, both of France

[73] Assignee: International Business Machines Corporation, Armonk, N.Y.

[22] Filed: Nov. 6, 1975

[21] Appl. No.: 629,460

[30] Foreign Application Priority Data

Dec. 27, 1974  France ............................. 74.43560

[52] U.S. Cl. ................................. 178/67; 325/324
[51] Int. Cl.² ...................................... H04L 27/22
[58] Field of Search ............... 178/67, 88; 325/60, 325/321, 40, 322, 323, 324, 42; 333/17, 18

[56] References Cited

UNITED STATES PATENTS 3,924,197  12/1975  Okano et al. ..................... 178/88
3,935,535  1/1976  Motley et al. ..................... 325/42

Primary Examiner—Benedict V. Safourek
Attorney, Agent, or Firm—Jack M. Arnold

[57] ABSTRACT

A data transmitting and receiving system in which data is transmitted by varying the phase and amplitude of a carrier, including a receiver which detects the data in a received signal while reducing the effects of noise components which alter the phase and amplitude of the received signal. An in-phase component and a quadrature component are derived from the received signal and are then rotated an angular amount which is a function of an estimated value of the phase error in the received signal. The rotated components are then compared with two sets of reference coordinates for selecting a pair of reference coordinates which have values closest to the values of the rotated in-phase and quadrature components, respectively. The estimated value of the phase error is derived as a trigonometric function of the rotated components and selected reference coordinates. The selected reference coordinates are indicative of the transmitted data.

9 Claims, 11 Drawing Figures $A = \pm 1 ; \pm 3$
$B = \pm 1 ; \pm 3$

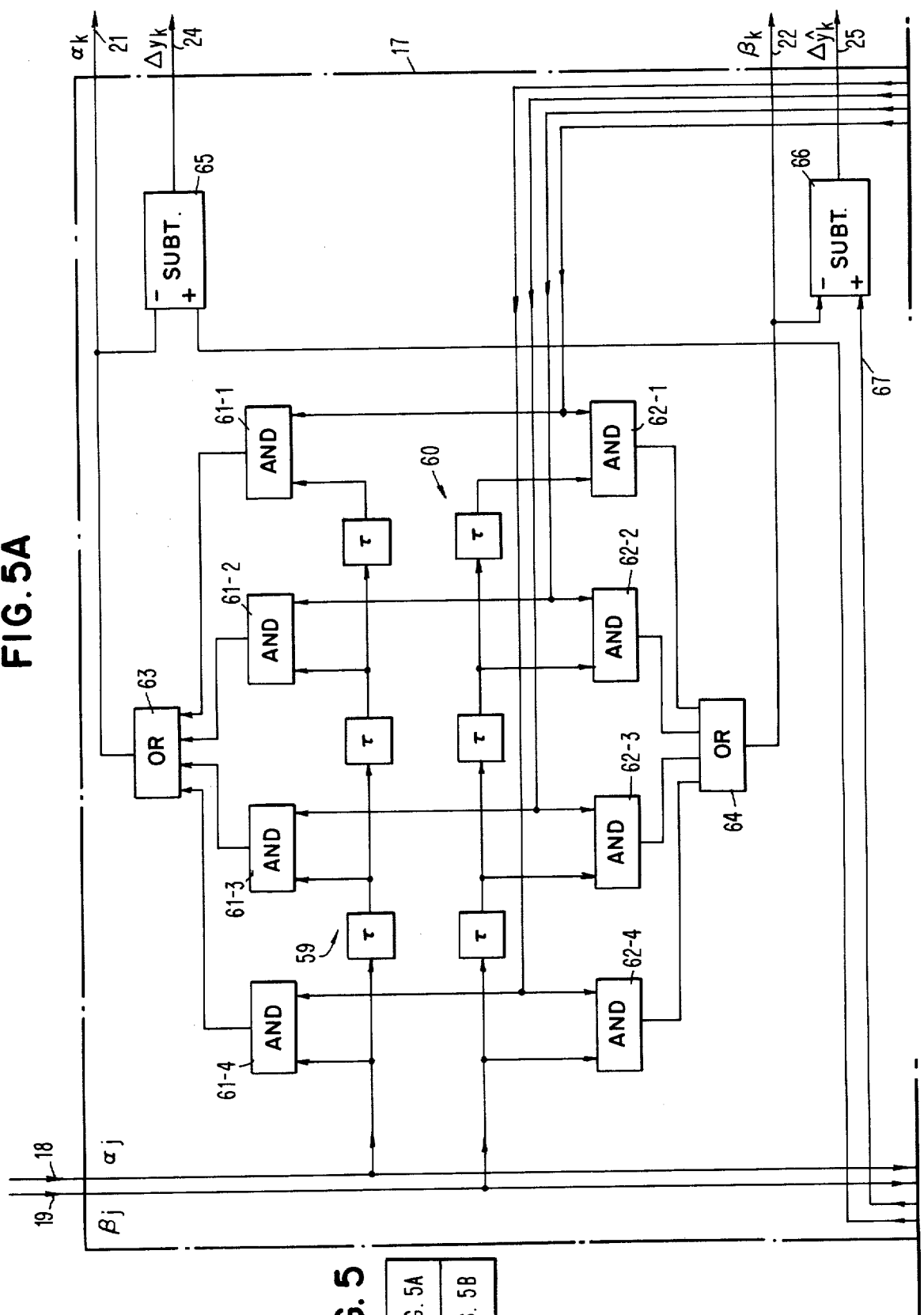

SYSTEM FOR DETECTING DIGITAL DATA TRANSMITTED BY MODULATING A CARRIER

BACKGROUND OF THE INVENTION

This invention relates digital data transmission systems and, more particularly, to a system for detecting data in a digital data transmission system in which data are transmitted by modulating the phase and amplitude of a carrier by discrete values at discrete times.

Digital data transmission systems are comprised of an emitter and a receiver interconnected by a transmission channel. In those systems the digital data, or bits, to be transmitted, appear as a sequence of bipolar binary pulses the frequency spectrum of which extends theoretically from zero to infinity. Mainly for saving purpose, telephone lines of the public network are used as transmission channels. Since telephone lines have generally a restricted pass band, 300–3000Hz, it is necessary to translate the energy of the bipolar binary pulses into the 300–3000Hz frequency band. Modulation, i.e., multiplication of the signal containing the information by a sinusoidal carrier, performs said translation. More particularly, this invention relates to the transmission systems that utilize modulation of the phase and amplitude of a carrier by discrete values at discrete times. These transmission systems include, in particular, the systems that utilize phase modulation, phase modulation combined with amplitude modulation, and quadrature-amplitude modulation, which modulation techniques are known as PSK (phase-shift-keyed) modulation A-PSK (Amplitude-phase-shift-keyed) modulation and QAM (quadrature-amplitude-modulation) modulation, respectively. PSK modulation is a modulation technique widely used and a detailed description thereof is provided, for example, in "Data Transmission" by W. R . Bennett and J. R. Davey, chapter 10, McGraw-Hill, New York, 1965, and "Principles of Data Communications" by R. W. Luckey, J. Salz and E. J. Weldon, Jr., Chapter 9, McGraw Hill, New York, 1968.

In the digital data transmission systems that utilize PSK modulation, the sequence of bits to be transmitted is, first of all, coverted into a sequence of symbols each of which can assume a discrete number of values, generally equal to a power of 2. Then, these symbols are transmitted, one by one, at times evenly separated by T seconds, and called sampling times, by varying the phase of the carrier in accordance with the value of these symbols, at sampling times. FIG. 1A shows a vector diagram illustrating the eight possible states of the carrier, at each sampling time, in a system using an 8 -phase PSK modulation for transmitting symbols capable of assuming eight distinct discrete values, each symbol being representative of a group of three bits. The amplitude of the carrier is constant and its phase can assume eight distinct discrete values.

In some digital data transmission systems, when the data transmission speed is to be increased and the number of the possible distinct discrete values of the phase of the carrier is not to be increased, A-PSK modulation is used. Briefly, in A-PSK modulation both amplitude and phase of the carrier are made to vary. For example, for a given sampling frequency F, if an 8-phase PSK modulation is used, a data transmission speed equal to 3F bits/sec. is obtained, since three bits are transmitted at each sampling time while using a two-amplitude level/eight-phase A-PSK modulation, a data transmission speed equal to 4F bits/sec. is obtained, since then four bits are transmitted at each sampling time. The vector diagram of FIG. 1B illustrates the 16 possible states of the carrier in a two-level/eight phase A-PSK modulation.

QAM modulation is a type of modulation technique which is more and more used, and a detailed decription thereof is provided, for example, in the above-indicated book by R. W. Lucky et al, Chapter 7, paragraphs 7-1-5 and 7-4-1. Briefly, in the digital data transmission systems using QAM modulation, the sequence of bits to be transmitted is, first of all, converted into the two sequences of independent symbols. Two symbols, one of from each of the two sequences, are simultaneously transmitted, at each sampling time, by varying the amplitude of two sub-carriers in quadrature, in accordance with the value of these symbols. These two sub-carriers have the same frequency and their phases are shifted one with respect to the other, by $\pi/2$ radians. Then, the two sub-carriers are combined and applied to the input of the transmission channel. The vector diagram of FIG. 1C illustrates the 16 possible states of the carrier resulting from the combination of the sub-carriers, in a QAM modulation obtained by a four-level amplitude modulation of each of sub-carriers A and B.

The carrier modulated by one of the modulation techniques briefly described above, is applied to the input of the transmission channel. The function of the transmission channel consists of delivering at its output, a signal relatively similar to the one applied to its input. It was seen above that telephone lines are more often used as transmission channels. The telephone lines are well fitted for voice transmission but not for transmitting digital data at high speed, for example at 9600 bits/sec., with a low probability of error. These lines introduce distrubances which alter the quality of the signals during their transmission through those lines and render difficult a correct detection of the transmitted data by the receiver. These disturbances mainly include the amplitude and phase distortions due to the imperfection of the characteristics of the lines, and various noise components due, in particular, to the intermediate processing of the transmitted signals, performed by the public telephone network. The amplitude and phase distortions cause an interaction between the successively emitted signals, known as intersymbol interference. The noise components include in particular phase intercept, frequency shift, phase jitter and white noise.

The intersymbol interference and the noise components have practically no effect in the systems transmitting digital data at low speed, i.e., at speeds under 2400 bits/sec., but prohibit a correct detection of data in a system operating at high speed as indicated above. In the receiver of a high speed system, it is imperative to provide devices for minimizing the effects of the intersymbol interference and noise components, to obtain a correct detection of the data. The effects of the intersymbol interference are minimized by an equalizer not laying within the scope of this invention. The effects of the noise components are minimized by the detection system of this invention.

U.S. Pat. application Ser. No. 596,557 filed July 15, 1975, now U.S. Pat. No. 3,972,000 entitled , "Phase Filter For Reducing The Effects of the Noise Components Altering Discrete Phase Modulated Signals" and which is assigned to the assignee of the present invention, describes a phase filter minimizing the effects of the noise components affecting the phase of the carrier in a digital data transmission system. In general, in this phase filter, the noise components are cancelled by subtracting an estimated value of the noise components, from the phase value of the received signal. The phase value of the received signal minus the estimated value of the noise components, is applied to a decision logic which separates, the phase value of the emitted signal, representative of the data, and a residual noise component therefrom. Said residual noise component is applied to predictive filtering means which generate the estimated values of the noise components therefrom.

A first drawback of this phase filter lies in the fact that it allows the derivation of the phase value of the emitted carrier, representative of the data, from the phase value of the received carrier, and therefore, requires the use of a device to extract the phase value of the received carrier from said carrier. A second drawback of this phase filter is that it permits the detection of the correct phase of the carrier but does not provide any information about the carrier amplitude. The use of this phase filter in a system using A-PSK modulation or QAM modulation requires, therefore, in addition, the use of a device for detecting the correct amplitude of the carrier.

Therefore, the object of this invention is to overcome these drawbacks by providing an improvement to the phase filter described in the above-mentioned U.S. Patent application. This improvement is comprised of a system for detecting digital data, allowing a correct detection of data transmitted by modulating a carrier from the in-phase and quadrature components of the received signal.

Another object of this invention is to provide such a data detection system allowing a correct detection of the data transmitted by modulating the phase and amplitude of the carrier.

Generally stated, this invention provides a system for detecting digital data transmitted by modulating the phase and amplitude of the carrier, wherein the in-phase and quadrature components of the received signal, are applied to a device which causes the phase of the received sighal to rotate by an angle equal to an estimated value of the phase error produced by the noise components generated by the transmission channel. The new in-phase and quadrature components supplied by the phase rotation device, are applied to a decision logic which provides the detected phase and amplitude, representative of data, in accordance with reference coordinates and a given selection criterion. The decision logic provides, in addition, the components of the residual phase error which are applied to a first conversion device providing the value of the residual phase error from these components. The residual phase error is applied to a predictive filter supplying an estimated value of the phase error. This one is applied to a second device converting the estimated phase value into its sin and cos trigonometrical functions which control the phase rotation device. The components of the residual phase error can be used to adjust the equalizer of the data receiver including the detection system of the invention.

SUMMARY OF THE INVENTION

In accordance with the present invention, a data transmission and reception system is disclosed in which data is transmitted by varying the phase and amplitude of a carrier by discrete values at discrete sampling times, including a reception system for detecting the transmitted data in a received signal while reducing the effects of the noise components altering the phase and amplitude of the received signal. There is means for deriving an in-phase component and a quadrature component from the received signal, including means for rotating the respective components an angular amount which is a function of an estimated value of the phase error present in the received signal. There is means for storing two sets of Q, where Q is an integer, reference coordinates defining Q states said carrier is capable of assuming at each sampling time. There is also means for comparing the rotated in-phase component and the rotated quadrature component with each of the Q reference coordinates of said first and second sets, respectively, for selecting the reference coordinates in the first and second sets which most closely compare to the values of the rotated in-phase component and quadrature component, respectively. Further, there is means for determining the estimated value of the phase error in the received signal as a trigonometric function of the rotated components and the selected reference coordinates. Finally, there is means for detecting the transmitted data from the selected reference coordinates.

BRIEF DESCRIPTION OF THE DRAWINGS

FIGS. 5, 5A and 5B are a detailed view of the decision logic shown as a block in FIG. 2.

DETAILED DESCRIPTION OF THE INVENTION

Figure 2:
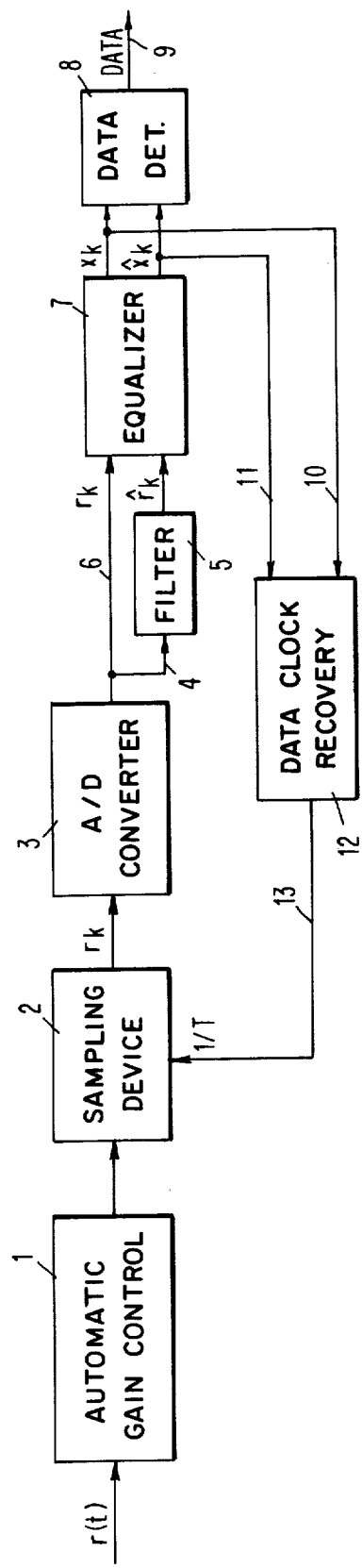
FIG. 2 schematically shows a digital data receiver including the data detection system of this invention.

FIG. 2 is a general scheme of a digital data receiver including the data detection system of the invention. This general scheme does not lie within the scope of this invention but allows to localize said invention in its context. Signal $r(t)$ received from the transmission channel is applied to the input of a conventional automatic gain control device 1 the presence of which at the input of the receiver is made necessary since the mean energy of the received signals is variable in time. The constant mean energy signal supplied by device 1 and which will be hereinafter referenced $r(t)$ for simplification purposes, is applied to the input of a conventional sampling device 2 which samples signal $r(t)$ at rate $1/T$ which is the modulation rate of the carrier. Sampled signal $r(kT)$ which will be referenced $r_k$, $k$ successively assuming all the integers, supplied by device 2, is applied to the input of a conventional analog to digital (A/D) converter 3 which provides a binary representation of said sampled signal $r_k$. Said signal $r_k$ supplied by A/D converter 3, is applied via line 4, to the input of a digital Hilbert filter 5 which shifts the phases of all the frequencies of the spectrum of signal $r_k$, by $\pi/2$ radians. As shown in the art, transfer function $H(f)$ of this filter is $$H(f) = e^{-j\pi/2 \text{ sign of } f}.$$

Signal $\hat{r}_k$ which is the Hilbert transform of $r_k$ is obtained at the output of Hilbert filter 5. In general, signals $r_k$ and $\hat{r}_k$ are designated by the terms, in-phase and quadrature components of the received signal, respectively. In-phase component $r_k$ provided by A/D converter 3 on line 6 and quadrature component $\hat{r}_k$ provided by Hilbert filter 5, are applied to the input of equalizer 7. Equalizer 7 is a complex equalizer, two examples of which are described respectively in U.S. Pat. No. 3,890,572 entitled, "Method and Apparatus Utilizing Phase Modulated Signals" and U.S. Pat. application Ser. No. 539,493 filed June 17, 1975, now U.S. Pat. No. 3,947,768 entitled, "Carrier Modulation Data Transmission Equalizers," each of which is assigned to the assignee of this invention. In-phase and quadrature components $x_k$ and $\hat{x}_k$ of the received equalized signal provided by equalizer 7, are applied to data detection system 8, of the invention, which outputs the detected data on line 9. In addition, components $x_k$ and $\hat{x}_k$ are applied via lines 10 and 11, respectively, to a data clock recovery device 12, an embodiment of whiich is described in "Simultaneous Adaptive Estimation and Decision Algorithm for Carrier Modulated Data Transmission Systems" by H. Kobayashi in IEEE Transactions on Communication Technology, Vol. COM-19, No. 3, June 1971, pages 268–280. Clock recovery device 12 supplied on line 13, the signal of frequency 1/T controlling sampling device 2.

Figure 3:
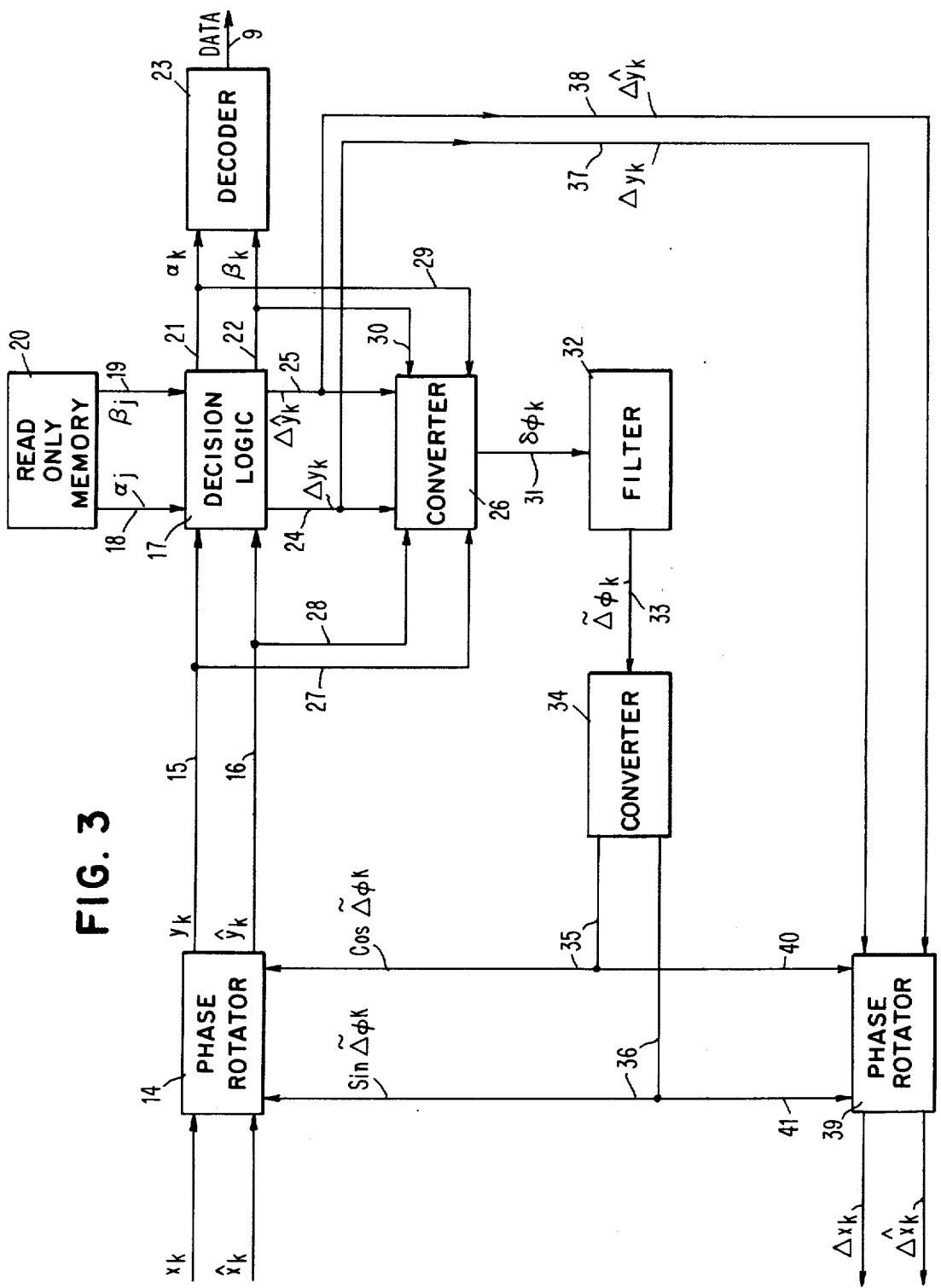
FIG. 3 schematically shows a data detection system according to this invention.

FIG. 3 is a block diagram of the data detection system according to the invention. The in-phase and quadrature components $x_k$ and $\hat{x}_k$ of the equalized signal are applied to the input of a phase rotation device 14 which rotates the signal with components $x_k$ and $\hat{x}_k$ by an angle equal to $-\Delta\tilde{\phi}_k$, $\Delta\tilde{\phi}_k$ being an estimated value of the phase error. Phase rotation device 14 provides the new in-phase and quadrature components $y_k$ and $\hat{y}_k$, of the signal rotated by $-\Delta\tilde{\phi}_k$ on lines 15 and 16, respectively. Components $y_k$ and $\hat{y}_k$ are applied via lines 15 and 16, respectively, to the input of a decision logic 17 which receives, in addition, via lines 18 and 19, reference coordinates $\alpha_j$, $\beta_j$ stored in a read-only memory 20. Decision logic 17 provides selected reference coordinates $\alpha_k$ and $\beta_k$ on lines 21 and 22, respectively. Reference coordinates $\alpha_k$ and $\beta_k$ are applied to a decoding circuit 23 which provides the data detected on line 9. In addition, decision logic 17 provides on lines 24 and 25, residual phase error components $\Delta y_k$ and $\Delta \hat{y}_k$ which are applied to a first conversion device 26. Conversion device 26 receives in addition, via lines 27 and 28, components $y_k$ and $\hat{y}_k$ respectively, and via lines 29 and 30, reference coordinates $\alpha_k$ and $\beta_k$, respectively, and outputs the value of residual phase error $\delta\phi_k$ which is applied to the input of a predictive filter 32, via line 31. Predictive filter 32 outputs estimated phase error value $\Delta\tilde{\phi}_k$ which is applied via line 33 to the input of a second conversion device 34 which provides on lines 35 and 36 the values of trigonometrical functions $\cos\Delta\tilde{\phi}_k$ and $\sin\Delta\tilde{\phi}_k$, respectively. These values are applied via lines 35 and 36 to phase rotation device 14. Residual phase error components $\Delta y_k$ and $\Delta \hat{y}_k$ supplied by decision logic 17 are applied via lines 37 and 38, respectively, to the input of a second phase rotation device 39 which rotates the signal with components $\Delta x_k$ and $\Delta \hat{x}_k$ which can be used to control the adjustment of equalizer 7 shown on FIG. 2.

The operation of the data detection system of the invention shown on FIG. 3, will now be described while also referring to the vector diagram of FIG. 4. One will consider the general case of a digital data transmission system in which the amplitude and phase of the carrier are modulated by discrete values on times evenly separated by T seconds.

The in-phase and quadrature components $x_k$ and $\hat{x}_k$ applied to the input of the detection system can be written $$x_k = (p_k + \Delta p_k) \cos(\phi_k + \Delta\phi_k) \qquad (1)$$

$$\hat{x}_k = (p_k + \Delta p_k) \sin(\phi_k + \Delta\phi_k) \qquad (2)$$

where $p_k$ is the amplitude of the carrier emitted at sampling time $t=kT$, representative of the data.

$\Delta p_k$ is the amplitude error representing the effects of the disturbances introduced by the transmission channel on the carrier amplitude.

$\phi_k$ is the phase of the carrier emitted at sampling time $t=kT$ representative of the data; and $\Delta\phi_k$ is the phase error representing the effects of the disturbances introduced by the transmission channel on the carrier phase.

Figure 4:
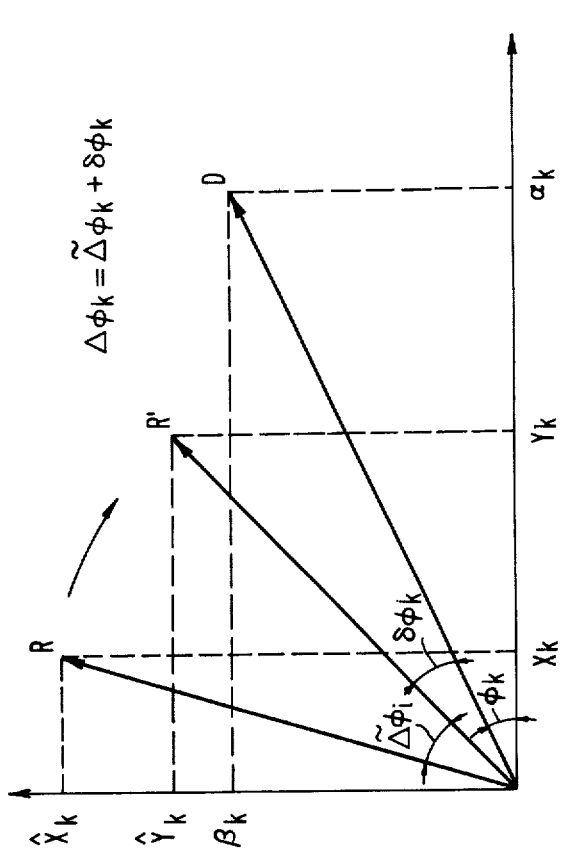
FIG. 4 shows a vector diagram illustrating the operation of the data detection system of this invention.

The received signal with components $x_k$ and $\hat{x}_k$ can be represented by vector $\overrightarrow{OR}$ in the vector diagram of FIG. 4 where $\overrightarrow{OD}$ represents the vector with components $\alpha_k = p_k \cos\phi_k$ and $\beta_k = p_k \sin\phi_k$, representative of data emitted at time $t=kT$. For detecting data, i.e., components $\alpha_k$ and $\beta_k$, correctly, it is necessary to minimize amplitude and phase errors $\Delta p_k$ and $\Delta\phi_k$.

According to the invention, these errors are minimized by rotating vector $\overrightarrow{OR}$ by an angle equal to $-\Delta\tilde{\phi}_k$, $\Delta\tilde{\phi}_k$ being an estimated value of phase error $\Delta\phi_k$. The process used to determine $\Delta\tilde{\phi}_k$ will be described later. Assume that $\overrightarrow{OR'}$ is the vector resulting from the rotation of vector $\overrightarrow{OR}$ by $-\Delta\tilde{\phi}_k$ and that $y_k$ and $\hat{y}_k$ are its in-phase and quadrature components. Then the values of these components can be obtained from the values of $x_k$ and $\hat{x}_k$ from the following relations:

$$y_k = x_k \cos\Delta\tilde{\phi}_k + \hat{x}_k \sin\Delta\tilde{\phi}_k \qquad (3)$$

$$\hat{y}_k = -x_k \sin\Delta\tilde{\phi}_k + \hat{x}_k \cos\Delta\tilde{\phi}_k \qquad (4)$$

Relations (3) and (4) are well known in the art and it is possible to refer, for example, to "Reference Data for Radio Engineers," Fifth Edition, Howard W. Sams and Co. Inc., 1973, page 44–14. In the system shown on FIG. 3, the rotation of vector $\overrightarrow{OR}$ is performed by phase rotation device 14. In a digital embodiment of the invention, phase rotation device 14 includes only a set of conventional binary multipliers and adder-subtractors arranged to provide components $y_k$ and $\hat{y}_k$ by using relations (3) and (4) from components $x_k$ and $\hat{x}_k$ applied to the detection system and from the values of $\cos\Delta\tilde{\phi}_k$ and $\sin\Delta\tilde{\phi}_k$ provided to phase rotation device 14 by conversion device 34 on lines 35 and 36 respectively. Components $y_k$ and $\hat{y}_k$ provided by phase rotation device 14 are applied via lines 15 and 16 to decision logic 17. In decision logic 17, components $y_k$ and $\hat{y}_k$ are compared to reference coordinates $\alpha_j$ and $\beta_j$ defined by the following relations:

$$\alpha_j = p_j \cos\phi_j \qquad (5)$$

$$\beta_j = p_j \sin\phi_j \qquad (6)$$

with $j=0, 1, 2, \ldots, Q$. Reference coordinates $\alpha_j$, $\beta_j$ define the Q possible states that the emitted carrier is capable of assuming at each sampling time. Reference coordinates $\alpha_j$, $\beta_j$ are stored in ROM 20. Decision logic 17 chooses among $\alpha_j$, $\beta_j$ the pair of reference coordinates $\alpha_k$, $\beta_k$ which is the closest to components $y_k$ and $\hat{y}_k$ in accordance with a given selection criterion which can depend upon the chosen particular type of modulation and upon the complexity of the circuits in use.

Figure 1A:
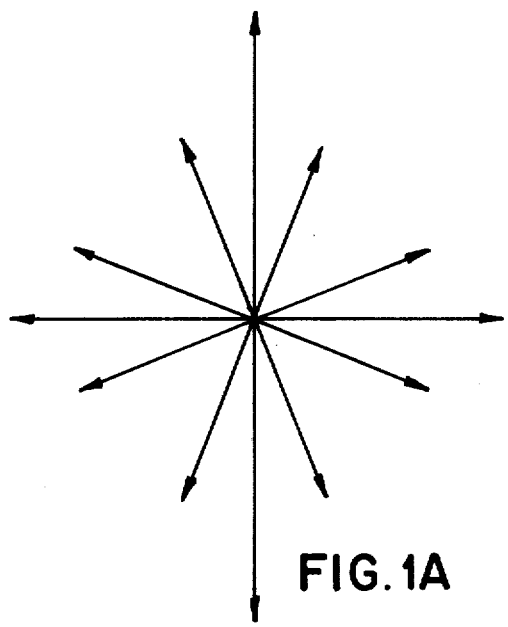
FIGS. 1A, 1B and 1C show vector diagrams illustrating PSK modulation, A-PSK modulation and QAM modulation, respectively.
Figure 1B:
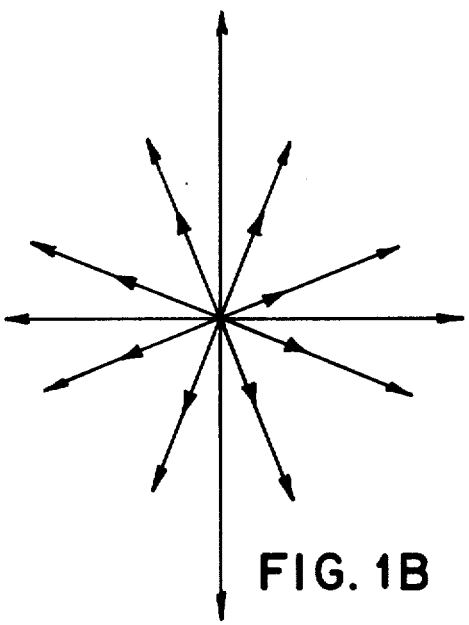
Figure 1C:
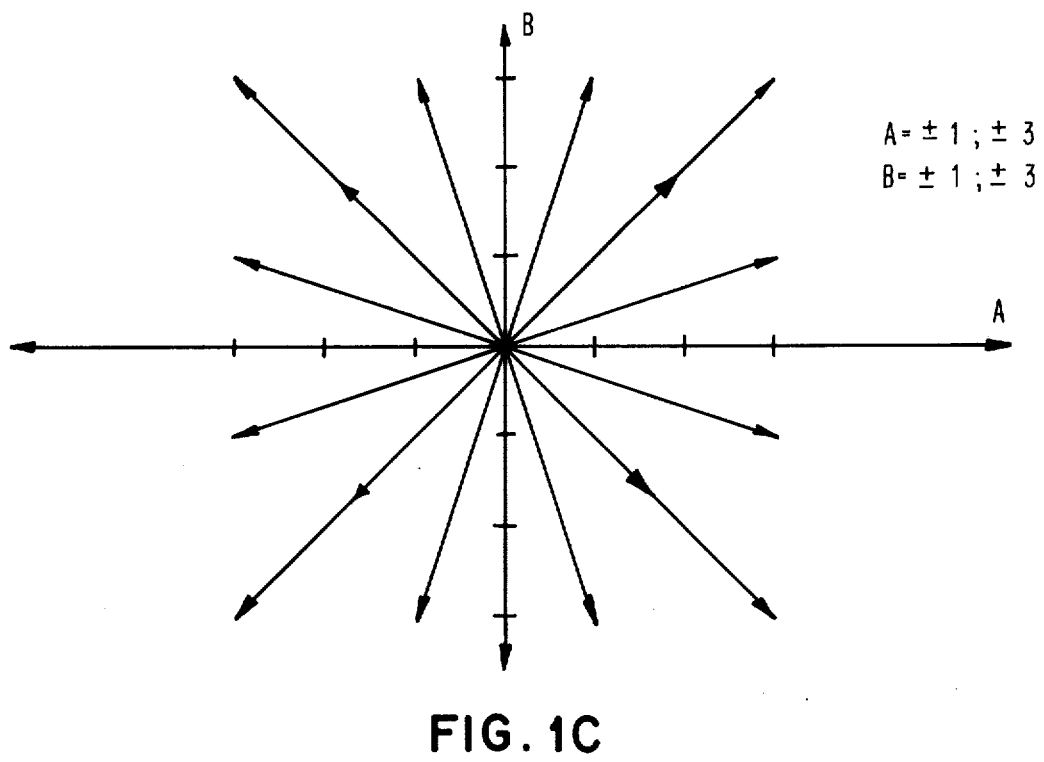

The pair of reference coordinates $\alpha_k$, $\beta_k$ selected by decision logic 17 is applied via lines 21 and 22 to decoding ccircuit 23 which provides detected data on line 9. Decoding circuit 23 is a conventional logic circuit supplying sequences of bits in accordance with the values of $\alpha_k$, $\beta_k$. The table given below is an example of sequences of bits provided by decoding circuit 23 in accordance with the values of $\alpha_k$, $\beta_k$ for a data transmission system using the QAM modulation scheme shown on FIG. 1C. This choice is not restrictive, any other correspondence table using the combinations of four binary elements being appropriate. It is even possible, for example, to contemplate the use of correspondence tables established not only with states $\alpha_k$ and $\beta_k$ at the sampling time, $t=iT$, but also with previous values, $\alpha_{k-1}$ and $\beta_{k-1}$ at sampling time $t=(k-1)T$.

| $\alpha_k$ | $\beta_k$ | Output of circuit 23 |
|---|---|---|
| +3 | +1 | 0 0 0 0 |
| +1 | +1 | 0 0 0 1 |
| +3 | +3 | 0 0 1 1 |
| +1 | +3 | 0 0 1 0 |
| −1 | +3 | 0 1 1 0 |
| −1 | +1 | 0 1 1 1 |
| −3 | +3 | 0 1 0 1 |
| −3 | +1 | 0 1 0 0 |
| −3 | −1 | 1 1 0 0 |
| −1 | −1 | 1 1 0 0 |
| −3 | −3 | 1 1 1 1 |
| −1 | −3 | 1 1 1 0 |
| +1 | −3 | 1 0 1 0 |
| +1 | −1 | 1 0 1 1 |
| +3 | −3 | 1 0 0 1 |
| +3 | −1 | 1 0 0 0 |

In the embodiment shown on FIG. 3, decision logic 17 provides, in addition, the following residual phase error components:

$$\Delta y_k = y_k - \alpha_k \quad (7)$$

$$\Delta \hat{y}_k = \hat{y}_k - \beta_k \quad (8)$$

on lines 24 and 25, respectively.

Figure 5B:
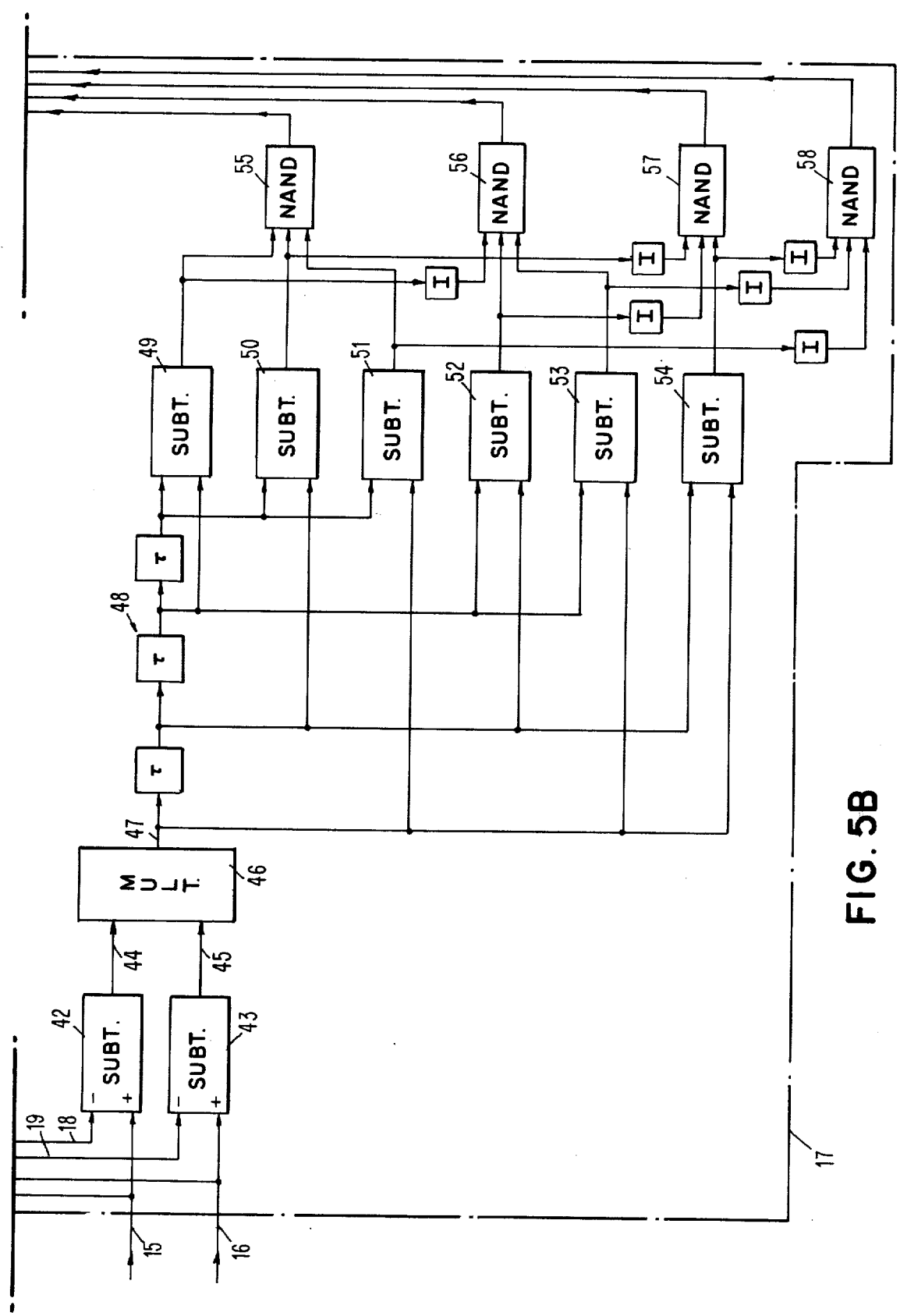

Now, an example of an embodiment of decision logic 17 will be described with reference to FIG. 5. In this example, the selection criterion of $\alpha_k$, $\beta_k$ is as follows: choose among the $\alpha_j$, $\beta_j$ pairs, the $\alpha_k$, $\beta_k$ pair for which $$d_k^2 = \text{minimum of } d_j^2 \quad (9)$$

with $$d_j^2 = (y_k - \alpha_j)^2 + (\hat{y}_k - \beta_j)^2, j=0, 1, \ldots Q \quad (10)$$

The selection criterion being chosen, the digital embodiment of decision logic 17 proceeds directly from relations (9) and (10) defining this criterion. Components $y_k$ and $\hat{y}_k$ provided by phase rotation device 14 are applied via lines 15 and 16, respectively, to the (+) inputs of two binary subtractors 42 and 43, the (−) inputs of which are connected via lines 18 and 19, respectively, to ROM 20. ROM 20 supplies reference coordinates $\alpha_j$ and $\beta_j$ simultaneously on lines 18 and 19 respectively. Subtractors 42 and 43 provide differences $(y_k - \alpha_j)$ and $(\hat{y}_k - \beta_j)$ on lines 44 and 45, respectively. These differences are applied to the input of a multiplying device 46 which provides quantity $d_j^2$ as defined by relation (10) on line 47. Multiplying device 46 includes two binary multipliers and a binary adder (not shown) arranged to provide $d_j^2$ in accordance with relation (10). To make the understanding of the invention easier, it is assumed in the remaining of the scheme of FIG. 5 that the phase of the carrier can assume four distinct discrete values at each sampling time. In other words, it is assumed that $j=1, 2, 3, 4$. Quantities $d_1^2, d_2^2, \ldots, d_4^2$ are successively applied to the input of a delay line 48 including three delay cells, each one of them introducing a t second delay equal to the time interval separating the appearance of two successive quantities $d_j^2$ at the output of multiplying device 46. Delay line 48 includes four taps separated by t seconds. The first tap which is situated at the output of delay line 48 is connected to the (+) input of three binary subtractors 49, 50 and 51 the (−) inputs of which are successively connected to the second, third and fourth taps of delay line 48. The second and third taps are connected to the (+) and (−) inputs of a bbinary subtractor 52, respectively. The second and fourth taps are connected to the (+) and (−) inputs of a binary subtractor 53, respectively. The third and fourth taps are respectively connected to the (+) and (−) inputs of a binary subtractor 54. The outputs of subtractors 49, 50 and 51 are connected to the three inputs of a NAND gate 55, respectively. The output of subtactor 49, through an inverter shown as block I, and the outputs of subtractors 52 and 53 are respectively connected to the three inputs of a NAND gate 56. The outputs of subtractors 50 and 52 are respectively connected, through two inverters I, to two inputs of a NAND gate 57 the third input of which is directly connected to the output of subtractor 54. The outputs of subtractors 51, 53 and 54 are respectively connected, through three inverters I, to the three inputs of a NAND gate 58. In addition, lines 18 and 19 are respectively connected to the input of two tapped delay lines 59 and 60 similar to delay line 48. The first, second, third and fourth taps of delay line 59, the first tap being situated at the output of delay line 59, are respectively connected to the first input of four AND gates 61-1, 61-2, 61-3 and 61-4. The first, second, third and fourth taps of delay line 60, are respectively connected to the first input of four AND gates 62-1, 62-2, 62-3 and 62-4. The output of NAND gate 55 is connected to the second input of AND gates 61-1 and 62-1. The output of NAND gate 56 is connected to the second input of AND gates 61-2 and 62-2. The output of NAND gate 57 is connected to the second input of AND gates 61-3 and 62-3, and the output of NAND gate 58 is connected to the second inpuut of AND gates 61-4 and 62-4. The outputs of AND gates 61-1, 61-2, 61-3 and 61-4 are connected to the input of an OR gate 63 the output of which is connected to line 21 (FIG. 3). The outputs of AND gates 62-1, 62-2, 62-3 and 62-4 are connected to the inputs of an OR gate 64 the output of which is connected to line 22 (FIG. 3). The output of OR gate 63 is also connected to the (−) input of a binary subtractor 65 the (+) input of which receives signal $y_k$ applied to line 15. The output of subtractor 65 is connected to line 24 (FIG. 3). The output of OR gate 64 is in addition, connected to the (−) input of a binary subtractor 66 the (+) input receives signal $\hat{y}_k$ through lines 16 and 67. The output of subtractor 66 is connected to line 25 (FIG. 3).

Now, the operation of decision logic 17 shown on FIG. 5, assuming that $j$ varies from 0 to 4, will be described. Quantities $d_1^2$, $d_2^2$, $d_3^2$, and $d_4^2$ successively supplied by multiplying device 46, are applied to the input of delay line 48. The outputs of NAND gates 55-58 are inhibited by means not shown on the Figure, until first quantity $d_1^2$ is available at the output of delay line 48. When $d_1^2$ is thus available on the first tap, quantities $d_2^2$, $d_3^2$ and $d_4^2$ are available at the second, third and fourth taps, respectively, in accordance with the connections between the taps of delay line 48 and the inputs of subtractors 49-54, as described above, the outputs of subtractors 49-54 respectively supply differences $d_1^2-d_2^2$, $d_1^2-d_3^2$, $d_1^2-d_4^2$, $d_2^2-d_3^2$, $d_2^2-d_4^2$, and $d_3^2-d_4^2$. In fact, only the 37 sign" outputs of the subtractors are used ans it is assumed that the "sign" output supplies a 1 or 0 bit according to its "positive" or "negative" sign. If differences $d_1^2-d_2^2$, $d_1^2-d_3^2$ and $d_1^2-d_4^2$ are all negative, this means that $d_1^2$ is minimum. Then a 0 bit appears at the output of subtractors 49, 50 and 51 and a 1 bit appears at the output of NAND gate 55 to the input of which are connected the outputs of subtractors 49, 50 and 51. Thus, a 1 bit delivered by NAND gate 55 means that $d_1^2$ is minimum. In the same way, it can be easily checked that a 1 bit delivered by NAND gates 56-58 means that $d_2^2$, $d_3^2$ and $d_4^2$, are minimum respectively. Simultaneously to the application of quantities $d_1^2$, $d_2^2$, $d_3^2$ and $d_4^2$ to the input of delay line 48, reference coordinates $\alpha_1$, $\alpha_2$, $\alpha_3$, $\alpha_4$ and $\beta_1$, $\beta_2$, $\beta_3$ and $\beta_4$ are respectively applied to the input delay lines 59 and 60. In this case, it will be also assumed that the outputs of AND gates 61-1 and 61-4 and 62-1 to 62-4 are inhibited until reference coordinates $\alpha_1$ and $\beta_1$ are respectively available on the first tap of delay lines 59 and 60. When reference coordinates $\alpha_1$ and $\beta_1$ are respectively available on the first tap of delay lines 59 and 60, reference coordinates $\alpha_2$ and $\beta_2$, $\beta_2$, and $\beta_3$, $\alpha_4$ and $\beta_4$ are respectively available at the second, third and fourth taps of delay lines 59 and 60. At this time, if it is assumed that $d_3^2$ is minimum, a 1 bit is supplied to the output of NAND gate 57 and enables AND gates 61-3 and 62-3 which allow the transfer of reference $\alpha_3$ and $\beta_3$ available on the third taps of delay lines 59 and 60, towards lines 21 and 22, through OR gates 63 and 64, respectively. Thus, the pair of reference coordinates $\alpha_k$, $\beta_k$ selected according to the criterion defined by relations (9) and (10), is obtained on lines 21 and 22. Coordinates $\alpha_k$, $\beta_k$ are, in addition, applied to the (−) inputs of binary subtractors 65 and 66, respectively, the (+) inputs of which receive components $y_k$ and $\hat{y}_k$, respectively. Subtractors 65 and 66 provide on lines 24 and 25, respectively, residual phase error components $\Delta y_y = y_y - \alpha_y$ and $\Delta \hat{y}_k = \hat{y}_k - \beta_k$.

By referring again to FIG. 3, it is seen that components $\Delta y_k$ and $\Delta \hat{y}_k$ provided by decision logic 17, components $y_k$ and $\hat{y}_k$ provided by phase rotation device 14 and reference coordinates $\alpha_k$, $\beta_k$ provided by decision logic 17 are applied via lines 24 and 25, 27 and 28, 29 and 30, respectively, to the input of conversion device 26. Conversion device 26 outputs the value of residual phase error $\delta\phi_k$ on line 29, as defined by the following relation:

$$\delta\phi_k = \Delta\phi_k - \Delta\tilde{\phi}_k \quad (11)$$

By referring to the vector diagram of FIG. 4, it can be written:

$$y_k = (p_k + \Delta p_k) \cos(\phi_k + \delta\phi_k) \quad (12)$$

$$\hat{y}_k = (p_k + \Delta p_k) \sin(\phi_k + \delta\phi_k) \quad (13)$$

By combining relations (12) and (13) with relations (5) and (6) and (7) and (8) recalled below:

$$\alpha_k = p_k \cos \phi_k \quad (5);$$

$$\beta_k = p_k \sin \phi_k \quad (6);$$

$$\Delta y_k = y_k - \alpha_k \quad (7);$$

$$\Delta \hat{y}_k = \hat{y}_k - \beta_k \quad (8)$$

the following equation is obtained:

$$\tan \delta\phi_k = \frac{y_k \Delta \hat{y}_k - \hat{y}_k \Delta y_k}{\alpha_k y_k + \beta_k \hat{y}_k} \quad (14)$$

By assuming that $\delta\phi_k$ is small, one has $\tan \delta\phi_k = \delta\phi_k$ and relation (14) becomes:

$$\delta\phi_k = \frac{y_k \Delta \hat{y}_k - \hat{y}_k \Delta y_k}{\alpha_k y_k + \beta_k \hat{y}_k} \quad (15)$$

It should be noted that the value of $\delta\phi_k$ can also be obtained only from $y_k$, $\hat{y}_k$, $\alpha_k$ and $\beta_k$. For that, it is sufficient to substitute the expressions of $\Delta y_k$ and $\Delta \hat{y}_k$ obtained from relations (7) and (8) for $\Delta y_k$ and $\Delta \hat{y}_k$ in relation (15). It is also possible to compute $\delta\phi_k$ from $\Delta y_k$, $\Delta \hat{y}_k$, $\alpha_k$ and $\beta_k$ by substituting the expressions obtained from relations (7) and (8) for variables $y_k$ and $\hat{y}_k$ in relation (15). In the embodiment described in this specification, it recommended to use the values of $\Delta y_k$ and $\Delta \hat{y}_k$ since expression (15) obtained in this way, requires a minimum number of multiplications and values $\Delta y_k$ and $\Delta \hat{y}_k$ will be used for other purposes, as this will be seen later. In a simplified embodiment, it will be possible to calculate a close value of $\delta\phi_k$ by substituting $\alpha_k$ and $\beta_k$ for $y_k$ and $\hat{y}_k$, respectively, in equation (15). Then, relation (15) becomes:

$$\delta\phi_k = \frac{\alpha_k \Delta \hat{y}_k - \beta_k \Delta y_k}{\alpha_k^2 + \beta_k^2} \quad (16)$$

This choice could involve a simplification of the calculations, values $A_k = \alpha_k/(\alpha_k^2 + \beta_k^2)$ and $B_k = \beta_k/(\alpha_k^2 + \beta_k^2)$ being kept in memory, equation (16) becomes:

$$\delta\phi_k = A_k /\Delta \hat{y}_k /-B_k \Delta y_k \quad (17)$$

In the digital embodiment of the invention, conversion device 26 includes a set of conventional binary multipliers and adder-subtractors and a binary divider, as described for example in U.S. Pat. No. 3,239,655 entitled, "Single Cycle Binary Divider" which is assigned to the assignee of the present invention and which is arranged to provide $\delta\phi_k$ from $y_k$, $\hat{y}_k$, $\alpha_k$, $\beta_k$, $\Delta y_k$ and $\Delta \hat{y}_k$ in accordance with relation (15).

Residual phase error $\delta\phi_k$ provide by conversion device 26 is applied via line 31 to the input of predictive filter 32 the function of which consists of predicting estimated phase error value $\Delta \tilde{\phi}_k$ from the previous residual phase errors. Such a predictive filter is described in details in above-cited U.S. Pat. application Ser. No. 596,557 which will be used as a reference. As indicated in the foreword of this description this above-cited patent application relates to a phase filter provided to minimize the effects of the noise components altering the phase of the received signal in a digital data transmission system. This phase filter includes two decision filters which can be connected in cascade or in parallel. The first decision filter cancels the noise components due to phase intercept and frequency shift, and the second decision filter cancels the random noise component due to phase jitter and white noise. In the cascade form of the phase filter, in the first decision filter, an estimated value of the noise components due to the phase intercept and frequency shift is subtracted from the value of the phase of the received signal. The result of this first subtraction is applied to a first decision logic which provides the residual noise component. Said component is applied to a first predictive filter which generates the estimated value of the noise components due to phase intercept and frequency shift from the previous residual noise components. In the second decision filter, an estimated value of the random noise component is subtracted from the result of the first subtraction. The result of this second subtraction is applied to a second decision logic which separates the emitted carrier phase value, representative of data, and the residual random noise component, therefrom. This one is applied to a second predictive filter which generates the estimated value of the random noise component from the previous residual random noise components. In the parallel form of the phase filter, an estimated value of the set of noise components due to phase intercept and frequency shift and to the random noise component, is subtracted from the phase value of the received signal. The result of this subtraction is applied to a decision logic which separates the emitted phase value, representative of data, and a residual noise component, therefrom. This one is applied in parallel to two predictive filters which generate an estimated value of the noise components due to phase intercept and frequency shift and an estimated value of the random noise component, respectively. These two estimated values are added to provide said set of noise components.

In the data detection system of the invention, residual phase error $\delta\phi_k$ is provided at the output of conversion device 26 and the predictive filters of said phase filter will be used as predictive filter 32, as indicated above.

If the effects of phase jitter and white noise can be neglected, linear predictive filter bearing reference No. 12, in above-cited U.S. Pat. application Ser. No. 596,557 will be used as predictive filter 32. This linear predictive filter is a digital filter defined by its transfer function in Z.

$$W(z) = \frac{2(1-\alpha)z^{-1} + (\alpha^2 - 1)z^{-2}}{(1 - z^{-1})^2} ; 0 < \alpha < 1 \quad (18)$$

an embodiment of which is shown on FIG. 4 of U.S. Pat. application Ser. No. 596,557.

Figure 6:
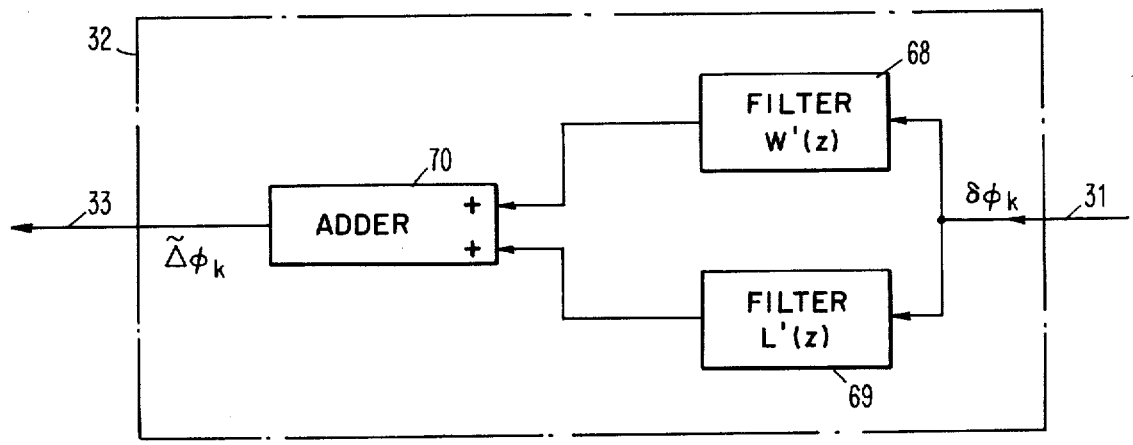
FIG. 6 shows a possible embodiment of the predictive filter shown as a block in FIG. 2.

If the effects of phase jitter and white noise cannot be neglected, and if the phase jitter characteristics are known, two predictive filters with fixed coefficients, connected in parallel as shown on FIG. 9B of previously reference U.S. Pat. application Ser. No. 596,557 and on FIG. 6 of this Patent application, will be used. Residual phase error $\delta\phi_k$ available at the output of converting device 26, on line 31 is applied in parallel, to the input of two digital filters 68 and 69 with transfer functions W'(z) and L'(z), respectively. The relationship between these transfer functions W'(z) and L'(z) is defined by the following relation:

$$1 + W'(z) + L'(z) = \left[ 1 + \frac{2(1-\alpha)z^{-1} + (\alpha^2-1)z^{-2}}{(1-z^{-1})^2} \right] \left[ 1 + \frac{N(z^{-1}) - aD(z^{-1})}{aD(z^{-1})} \right] \quad (19)$$

where $0 < \alpha < 1$, $$a = \frac{N(o)}{D(o)} ;$$

and

N(z) and D(z) are polynomials all of whose zeroes lie outside the unit circle. The outputs of two filters 68 and 69 are respectively connected to both (+) inputs of a binary adder 70 the output of which provides the estimated value of phase error $\Delta\tilde{\phi}_k$ on line 33. For a more detailed description of the arrangement shown on FIG. 6, it is possible to refer to above-cited U.S. Pat. application Ser. No. 596,557.

Figure 7:
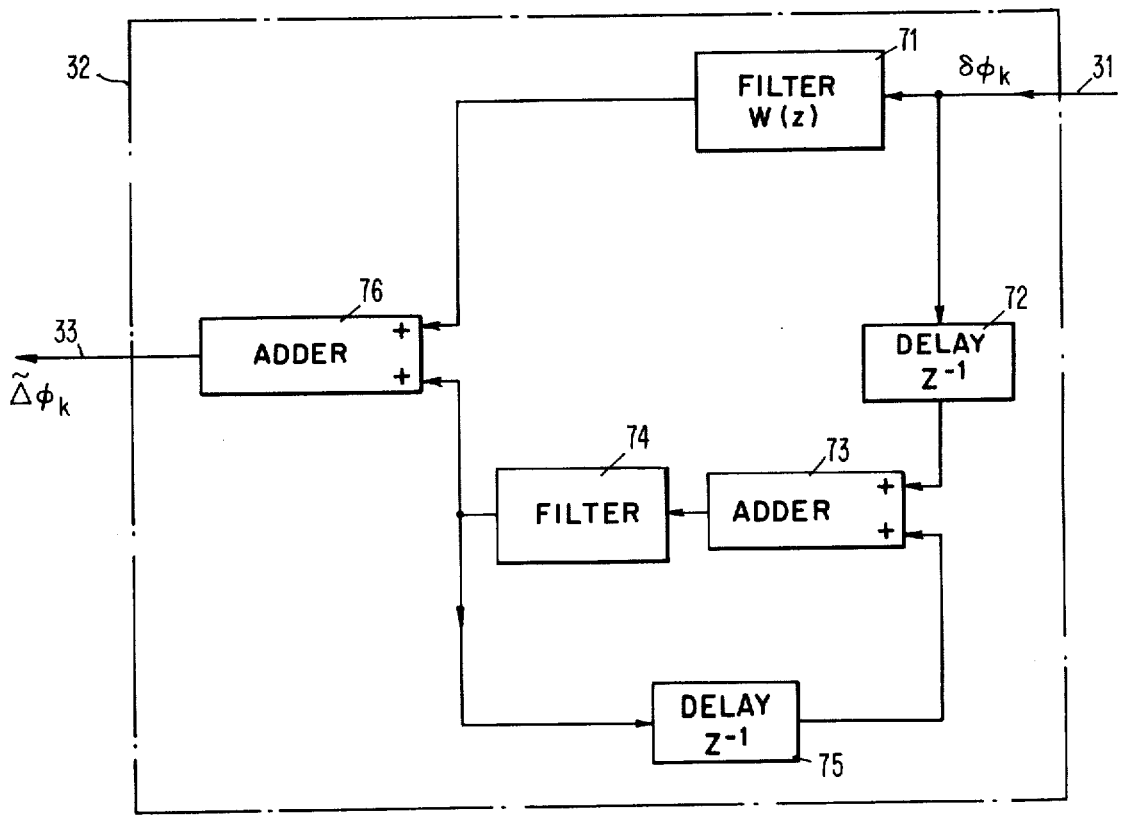
FIG. 7 shows another possible embodiment of the predictive filter shown as a block in FIG. 2.

If the effects of phase jitter and white noise cannot be neglected, and if the phase jitter characteristics are unknown or time-variable, one will use a predictive filter with fixed coefficients and transfer function W(z) as defined by relation (17) and an adaptive predictive filter connected in parallel as shown on FIG. 10B of above-cited U.S. Pat. application Ser. No. 596,577 and on FIG. 7 of this application. Residual phase error $\delta\phi_k$ available at the output of conversion device 26, on line 31, is applied in parallel to the input of a predictive filter 71 with fixed coefficients of transfer function W(z) defined by relation (18) and to the input of a delay element 72 introducing a T second delay. The output of delay element 72 is applied to a first (+) input of a binary adder 73 the output of which is connected to the input of a binary adder 73 the output of which is connected to the input of an adaptive predictive filter 74. The function of adaptive predictive filter 74 is to generate an estimated value of the random noise components, representative of phase jitter and white noise from the previous values of residual phase error $\Delta\phi_k$. Said adaptive predictive filter 74 can be of a Wiener predictive filter as shown on FIG. 7 of above cited U.S. Pat. application Ser. No. 596,557. The output of adaptive predictive filter 74 is connected through a delay element 75 similar to delay element 72, to the second (+) input of adder 73. The output of adaptive predictive filter 74 is, in addition, connected to a first (+) input of a binary adder 76 the second (+) input of which is connected to the output of predictive filter 71 with fixed coefficients. The output of adder 76 provides the estimated value of phase error $\Delta\tilde{\phi}_k$ on line 33. For a more detailed description of the arrangement shown on FIG. 7 and of its operation, it is possible to refer to above-cited U.S. Pat. application Ser. No. 596,557.

By referring again to FIG. 3, it is seen that the estimated value of phase error $\Delta\tilde{\phi}_k$ provided by predictive filter 32, is applied via line 33, to the input of a conversion device 34. The function of conversion device 34 consists of converting $\Delta\tilde{\phi}_k$ into cos $\Delta\tilde{\phi}_k$ and sin $\Delta\tilde{\phi}_k$. As shown in the art, conversion device 34 can be a ROM in which the values of cos $\Delta\tilde{\phi}_k$ and sin $\Delta\tilde{\phi}_k$ are stored in permanence by the manufacturer, in memory locations the address of which corresponds to the value of $\Delta\tilde{\phi}_k$. The value of cos $\Delta\tilde{\phi}_k$ and sin $\Delta\tilde{\phi}_k$ provided by conversion device 34 are applied via lines 35 and 36 to phase rotation device 14.

When the data detection system of the invention is used with a complex equalizer shown as a block in FIG. 2, it is possible to control the adjustment of this equalizer from residual phase error components $\Delta y_k$ and $\hat{y}_k$ provided by decision logic 17. For that, components $\Delta y_k$ and $\Delta\hat{y}_k$ are applied via lines 37 and 38 to the input of a phase rotation device 39 which rotates the signal with components $\Delta y_k$ and $\Delta\hat{y}_k$ by an angle equal to $\Delta\tilde{\phi}_k$. The components of the signal resulting from this rotation, which can be referenced $\Delta x_k$ and $\Delta\hat{x}_k$, can be obtained from the values of $\Delta y_k$ and $\Delta\hat{y}_k$ from the following relations:

$$\Delta x_k = \Delta y_k \cos \Delta\tilde{\phi}_k - \Delta\hat{y}_k \sin \Delta\tilde{\phi}_k \quad (20)$$

$$\Delta\hat{x}_k = \Delta y_k \sin \Delta\tilde{\phi}_k + \Delta\hat{y}_k \cos \Delta\tilde{\phi}_k \quad (21)$$

This phase rotation device 39 which receives the values of cos $\Delta\tilde{\phi}_k$ and sin $\Delta\tilde{\phi}_k$ provided by conversion device 32, via lines 40 and 41 could be, as phase rotating device 14, a set of binary multipliers and adder-subtractors arranged in accordance with relations (20) and (21).

While the invention has been particularly shown and described with reference to the preferred embodiment thereof, it will be understood by those skilled in the art that various changes in form and details may be made therein without departing from the spirit and scope of the invention.

What is claimed is:

1. In a data transmission and reception system in which data is transmitted by varying the phase and amplitude of a carrier by discrete values at discrete sampling times, a reception system for detecting the transmitted data in a received signal while reducing the effects of the noise components altering the phase and amplitude of said received signal, comprising:
   means for deriving an in-phase component and a quadrature component from said received signal;
   means for rotating said in-phase component and said quadrature component, an angular amount which is a function of an estimated value of the phase error in said received signal;
   means for storing two sets of Q, where Q is an integer, reference coordinates defining Q possible states said carrier is capable of assuming during each sampling time;
   means for comparing the rotated in-phase component and the rotated quadrature component with each of the Q reference coordinates of said first and second sets, respectively, for selecting the reference coordinates in the first and second sets which most closely compare to the values of the rotated in-phase component and the quadrature component, respectively, during each sampling time;
   means for determining said estimated value of the phase error in said received signal as a trigonometric function of the rotated components and the selected reference coordinates; and
   means for detecting the transmitted data from the selected reference coordinates.

2. In a data transmission and reception system in which data is transmitted by varying the phase and amplitude of a carrier by discrete values at discrete sampling times, a reception system of detecting the transmitted data in a received signal while reducing the effects of the noise components altering the phase and amplitude of said received signal, comprising:
   means for deriving in-phase and quadrature components $x_k$ and $\hat{x}_k$, respectively from said received signal during each sampling time;
   phase rotation means for rotating said components $x_k$ and $\hat{x}_k$ by an angle equal to $-\Delta\tilde{\phi}_k$, where $\Delta\tilde{\phi}_k$ is an estimated value of the phase error affecting the phase of said received signal during each sampling time, for deriving rotated components $y_k$ and $\hat{y}_k$, respectively;
   storage means for storing two sets of reference coordinates $\alpha_j$ and $\beta_j$, respectively, where J=0, 1, 2, . . . , Q, where Q is an integer which defines the Q possible states said carrier is capable of assuming during each sampling time;
   logic means for comparing components $y_k$ and $\hat{y}_k$ with all reference coordinates $\alpha_j$ and $\beta_j$, respectively, to select a pair of reference components $\alpha_k$ and $\beta_k$ which is closest to components $y_k$ and $\hat{y}_k$, respectively, in accordance with a predetermined selection criterion, with the selected pair of reference coordinates $\alpha_k$ and $\beta_k$ being representative of the transmitted data;
   means for providing $\Delta\tilde{\phi}_k$ as a trigonometric function of $y_k$, $\hat{y}_k$, $\alpha_k$ and $\beta_k$; and
   detecting said transmitted data from $\alpha_k$ and $\beta_k$ during each sampling time.

3. The combination claimed in claim 2, wherein said predetermined selection criterion comprises:
   means for choosing among the pairs of reference coordinates $\alpha_j$, $\beta_j$, the pair $\alpha_k$, $\beta_k$ for which $$d_k^2 = \text{minimum of } d_j^2$$

with $$d_j^2 = (y_k - \alpha_j)^2 - (\hat{y}_k - \beta_j)^2, j = 0, 0, 1, \ldots, Q.$$

4. The combination claimed in claim 2, wherein said means for providing $\Delta\tilde{\phi}_k$ comprises:
   first conversion means for providing a value of residual phase error $\delta\phi_k$ as a function of $y_k$, $\hat{y}_k$, $\alpha_k$ and $\beta_k$, with $\delta\phi_k$ representing the difference between the phase error affecting the phase of said received signal and said estimated value of phase error, $\Delta\tilde{\phi}_k$;
   filter means for generating $\Delta\tilde{\phi}_k$ from the previous values of $\delta\phi_k$; and
   second conversion means for providing the values of trigonometric functions cos $\Delta\tilde{\phi}_k$ and sin $\Delta\tilde{\phi}_k$ in response to the provision of $\Delta\tilde{\phi}_k$ from said filter means, with cos $\Delta\tilde{\phi}_k$ and sin $\Delta\tilde{\phi}_k$ being applied to said phase rotation means for rotating $x_k$ and $\hat{x}_k$ by said angle $-\Delta\tilde{\phi}_x$.

5. The combination claimed in claim 4 wherein said first conversion means provides said value of residual phase error $\Delta\phi_k$ in accordance with the relation:

$$\Delta\phi_k = \frac{y_k \Delta\hat{y}_k - \hat{y}_k \Delta y_k}{\alpha_k y_k + \beta_k \hat{y}_k}$$

where $\Delta y_k = y_k - \alpha_k$ and $\Delta \hat{y}_k \; \hat{y}_k - \beta_k$.

6. The combination claimed in claim 4 wherein said first conversion means provides said value of residual phase error $\Delta\phi_k$ in accordance with the relation:

$$\Delta\phi_k = \frac{\alpha_k \Delta \hat{y}_k - \beta_k \Delta y_k}{\alpha_k^2 + \beta_k^2}$$

where $\Delta y_k = y_k - \alpha_k$ and $\Delta \hat{y}_k - ]\hat{y}_k - \beta_k$ 7. The combination claimed in claim 4 wherein said second conversion means comprises a read only memory.

8. The combination claimed in claim 4 wherein said filter means comprises:
a first and a second linear filter with transfer function $W'(z)$ and $L'(z)$ respectively, the inputs of which are both connected to the output of said first conversion means, the relationship between transfer functions $W'(z)$ and $L'(z)$ being defined by the following relation:

$$1 + W'(z) + L'(z) = \left[ 1 + \frac{2(1-\alpha)z^{-1} + (\alpha^2-1)z^{-2}}{(1-z^{-1})^2} \right]$$
$$\left[ 1 + \frac{N(z^{-1}) - aD(z^{-1})}{aD(x^{-1})} \right]$$

where $0 < \alpha < 1$;

$$a = \frac{N(o)}{D(o)};$$

and $N(z)$ and $D(z)$ are z-polynomials all of whose zeroes lie outside the unit circle, and an adder both inputs of which are connected to the outputs of said first and second linear filters, respectively, and the output of which connected to the input of said second conversion means, provides said estimated value of phase error $\Delta\tilde{\phi}$.

9. The combination claimed in claim 4, wherein said filter means comprises:
a linear filter the input of which is connected to the output of said first conversion means,
a first delay element introducing an elementary delay T equal to the period of the sampling times and the input of which is connected to the output of said first conversion means;
a first adder with two inputs, a first input of which is connected to the output of said first delay element;
an adaptive predictive filter the input of which is connected to the output of said first adder, to generate an estimated value of the random noise component from the signal provided by the output of said first adder;
a second delay element, identical to said first delay element the input of which is connected to the output of said adaptive predictive filter and the output of which is connected to the second input of said first adder; and
a second adder both inputs of which are connected to the outputs of said linear filter and said adaptive predictive filter, respectively, and the output of which provides said estimated value of phase error, $\Delta\tilde{\phi}_k$.

* * * * *